United States Patent
Hecht et al.

(10) Patent No.: US 11,223,480 B2
(45) Date of Patent: Jan. 11, 2022

(54) DETECTING COMPROMISED CLOUD-IDENTITY ACCESS INFORMATION

(71) Applicant: CyberArk Software Ltd., Petach-Tikva (IL)

(72) Inventors: Asaf Hecht, Petach-Tikva (IL); Kobi Ben Naim, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 216 days.

(21) Appl. No.: 15/860,527

(22) Filed: Jan. 2, 2018

(65) Prior Publication Data

US 2019/0207771 A1    Jul. 4, 2019

(51) Int. Cl.
*H04L 9/32* (2006.01)
*H04L 9/14* (2006.01)
*H04L 9/30* (2006.01)
*H04L 29/06* (2006.01)

(52) U.S. Cl.
CPC .............. *H04L 9/3247* (2013.01); *H04L 9/14* (2013.01); *H04L 9/30* (2013.01); *H04L 9/3226* (2013.01); *H04L 63/083* (2013.01); *H04L 63/0807* (2013.01); *H04L 63/10* (2013.01); *H04L 63/20* (2013.01)

(58) Field of Classification Search
CPC . H04L 9/3247; H04L 9/14; H04L 9/30; H04L 9/3226; H04L 63/10; H04L 63/20; H04L 63/0807; H04L 63/083; H04L 9/32
See application file for complete search history.

(56) References Cited

U.S. PATENT DOCUMENTS

| | | | |
|---|---|---|---|
| 7,865,931 B1* | 1/2011 | Stone | G06F 21/31 713/170 |
| 8,355,982 B2* | 1/2013 | Hazel | G06Q 20/04 705/35 |
| 8,627,114 B2* | 1/2014 | Resch | H04L 1/0045 713/165 |
| 10,248,953 B2* | 4/2019 | Salama | G06Q 20/405 |
| 2005/0102499 A1* | 5/2005 | Kosuga | G06F 21/64 713/152 |
| 2005/0108539 A1* | 5/2005 | Skog | H04L 63/08 713/176 |

(Continued)

*Primary Examiner* — Shanto Abedin
*Assistant Examiner* — Howard H. Louie
(74) *Attorney, Agent, or Firm* — Finnegan, Henderson, Farabow, Garrett & Dunner, LLP

(57) ABSTRACT

Systems and methods are provided for identifying potentially compromised cloud-based access information. The systems and methods include providing a unique signature for insertion into application programming interface (API) communications to be sent from a network resource to a cloud application executable in a cloud environment. The unique signature can be associated with an access token that a particular identity can use to request access to the cloud application. The systems and methods include accessing a log associated with the cloud environment, identifying the unique signature and the access token using information in the log, accessing a trusted validation resource storing signature information associated with the access token, determining whether the unique signature is valid, and determining whether the access token is potentially compromised.

24 Claims, 4 Drawing Sheets

(56) References Cited

U.S. PATENT DOCUMENTS

| | | | | |
|---|---|---|---|---|
| 2012/0060225 | A1* | 3/2012 | Chu | G06F 21/10 |
| | | | | 726/26 |
| 2015/0032626 | A1* | 1/2015 | Dill | G06Q 20/385 |
| | | | | 705/44 |
| 2015/0163065 | A1* | 6/2015 | Pan | H04L 9/3234 |
| | | | | 713/176 |
| 2015/0181415 | A1* | 6/2015 | Raleigh | H04M 15/43 |
| | | | | 455/418 |
| 2015/0288694 | A1* | 10/2015 | Liebl, III | H04L 63/0884 |
| | | | | 713/182 |
| 2016/0285891 | A1* | 9/2016 | Byers | H04L 63/0884 |
| 2017/0141926 | A1* | 5/2017 | Xu | H04L 9/3247 |
| 2017/0237717 | A1* | 8/2017 | Starosielsky | G06F 21/602 |
| | | | | 713/176 |

* cited by examiner

DETECTING COMPROMISED CLOUD-IDENTITY ACCESS INFORMATION

BACKGROUND

Cloud computing technologies are broadly applicable in many technological fields. As a result, many organizations worldwide are using cloud technologies, such as AMAZON WEB SERVICES, MICROSOFT AZURE, and others. Rely on a cloud computing implementation of an application architecture can reduce development times and development costs, while increasing the flexibility and scalability of applications. But cloud computing implementations add a new layer of security risks. Access to a cloud environment can be controlled through access credentials. If these access credentials are stolen, malicious users can alter an organization's cloud deployment to serve their own purposes, for example stealing data or incurring fees. Stolen access credentials, for instance, could be used to create a cryptocoin mining operation using an organization's cloud-computing account. The mining operation would provide the mined cryptocurrency to the hackers, while the costs of mining would be assessed to the cloud-computing account of the hacked organization.

Current approaches to securing access credentials are limited, often complicated to implement, time-consuming, costly, or requiring specific security knowledge or training to use. Cloud credentials should be difficult to guess, securely stored, periodically rotated, used according to a least-privileged philosophy, monitored, audited, recorded, and secured at rest in a tamper-proof storage location. Unfortunately, such a comprehensive approach to security is rarely feasible. An organization's cloud environment might have hundreds of access keys and perform thousands API function calls every day. Managing such an expansive deployment requires significant time and effort.

Therefore organizations must balance the effort required to manage access credentials security with many other security tasks, given a limited security budget and limited time. Organizations must prioritize and cannot always devote an ideal amount of effort to access credentials security. Further, organizations often fail to perform the security mitigation steps described above. Even when an organization does devote the time and effort to properly securing access credentials, an advanced attacker (one with the budget, knowledge, time, and motivation) can still break or bypass such defense mechanisms and steal the access credentials of the organization.

Consequently, systems and methods for securely managing access credentials are necessary. Such systems and methods should enable detection of compromised or unsecured access credentials, or the use of such access credentials. The disclosed systems and methods enable such detection, addressing a technical problem arising in computer networking and providing a technical solution to existing problems with cloud computing security.

SUMMARY

Disclosed embodiments can associate access tokens with digital signatures or additional identifying information. The digital signatures can be inserted into API communications between managed network resources and a cloud environment. By analyzing records of API communications associated with the cloud environment, or API communications intercepted by envisioned embodiments, the unmanaged or potentially compromised access tokens can be identified.

Disclosed embodiments include non-transitory computer readable media storing instructions. When executed by at least one processor, the instructions can cause the at least one processor to perform operations for identifying potentially compromised cloud-based access information. The operations can include providing a unique signature for insertion into application programming interface (API) communications to be sent from a network resource to a cloud application executable in a cloud environment. The unique signature can be associated with an access token that a particular identity can use to request access to the cloud application. The operations can also include accessing a log associated with the cloud environment. The log can identify a first API communication sent to the cloud environment from the network resource. The operations can further include identifying the unique signature and the access token. The unique signature and the access token can be identified from within the first API communication. The operations can also include accessing a trusted validation resource storing signature information associated with the access token, and determining, based on the trusted validation resource, whether the unique signature is valid. The operations can further include determining, based on whether the unique signature is valid, whether the access token is potentially compromised.

Disclosed embodiments also include a computer-implemented method for identifying potentially compromised cloud-based access information. The method can include a step of providing a unique signature for insertion into application programming interface (API) communications to be sent from a network resource to a cloud application executable in a cloud environment. The unique signature can be associated with an access token that a particular identity can use to request access to the cloud application. The method can include a step of accessing a log associated with the cloud environment. The log can identify a first API communication sent to the cloud environment from the network resource. The method can include a step of identifying, from within the first API communication, the unique signature and the access token. The method can include the steps of accessing a trusted validation resource storing signature information associated with the access token and determining, based on the trusted validation resource, whether the unique signature is valid. Furthermore the method can include the step of determining, based on whether the unique signature is valid, whether the access token is potentially compromised.

Disclosed embodiments further include non-transitory computer readable media including instructions. When executed by at least one processor the instructions can cause the at least one processor to perform operations for scanning a network to identify potentially compromised cloud-based access information. The operations can include actively scanning a plurality of network resources in a network that is separate from a cloud environment. The plurality of network resources can be configured to request access to one or more cloud applications executable in the cloud environment. The operations can include identifying a first access token in a first location on a first network resource that a first identity can use to request access to a first cloud application executable in the cloud environment. This identification can be based on the active scan of the plurality of network resources. The operations can include identifying a second access token in a second location on a second network resource that a second identity can use to request access to a second cloud application executable in the cloud environment. This identification can be based on the active scan of the plurality of network resources. The operations can include accessing a secure registry of approved access token location information. The secure registry can identify a plurality of access tokens and a plurality of corresponding locations where the plurality of access tokens are permitted to be stored. The operations can include determining, based on the secure registry, that the first location is an approved storage location for the first access token. The operations can further include determining, based on the secure registry, that the second location is not an approved storage location for the second access token.

Disclosed embodiments also include a computer-implemented method for scanning a network to identify potentially compromised cloud-based access information. The method can include the step of actively scanning a plurality of network resources in a network that is separate from a cloud environment. The plurality of network resources can be configured to request access to one or more cloud applications executable in the cloud environment. The method can include the step of identifying a first access token in a first location on a first network resource that a first identity can use to request access to a first cloud application executable in the cloud environment. This identification can be based on the active scan of the plurality of network resources. The method can include the step of identifying a second access token in a second location on a second network resource that a second identity can use to request access to a second cloud application executable in the cloud environment. This identification can be based on the active scan of the plurality of network resources. The method can include the step of accessing a secure registry of approved access token location information. The secure registry can identify a plurality of access tokens and a plurality of corresponding locations where the plurality of access tokens are permitted to be stored. The method can include the step of determining, based on the secure registry, that the first location is an approved storage location for the first access token. The method can further include the step of determining, based on the secure registry, that the second location is not an approved storage location for the second access token.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

As used herein, an "identity" describes a natural or legal person (e.g., an individual or a company), a physical computing resource (e.g., a server or computing device, etc.), or a logical object (e.g., a database, a network account, an application, IP address, an endpoint, etc.) associated with certain rights, services, credentials, and/or descriptive information in the context of a cloud-computing environment. For example, a cloud-computing environment can associate an identity with a computing device, another identity with a user of the device, and an additional identity with an application running on the computing device. A cloud-computing environment can be configured to maintain an identity as stored data and/or instructions. In some embodiments, an identity is a user account on a network resource.

As used herein, "access token" refers to data and/or instructions enabling an identity to access a cloud-computing environment. For example, an access token can include credentials (e.g., a user name or password) or keys (e.g., cryptographic). The cloud-computing environment can be configured to use an access token for authorization and/or authentication of an API communication. For example, AMAZON WEB SERVICES defines access keys for making programmatic calls to AMAZON WEB SERVICES Application Programming Interface Operations. Access keys can include an access key id and an access key value, as well as potentially other information. Access keys can be used to sign programmatic requests made to the AMAZON WEB SERVICES cloud-computing environment. Of course, other cloud-computing environments (e.g., MICROSOFT AZURE, IBM CLOUD, etc.) may be used as well.

Figure 1:
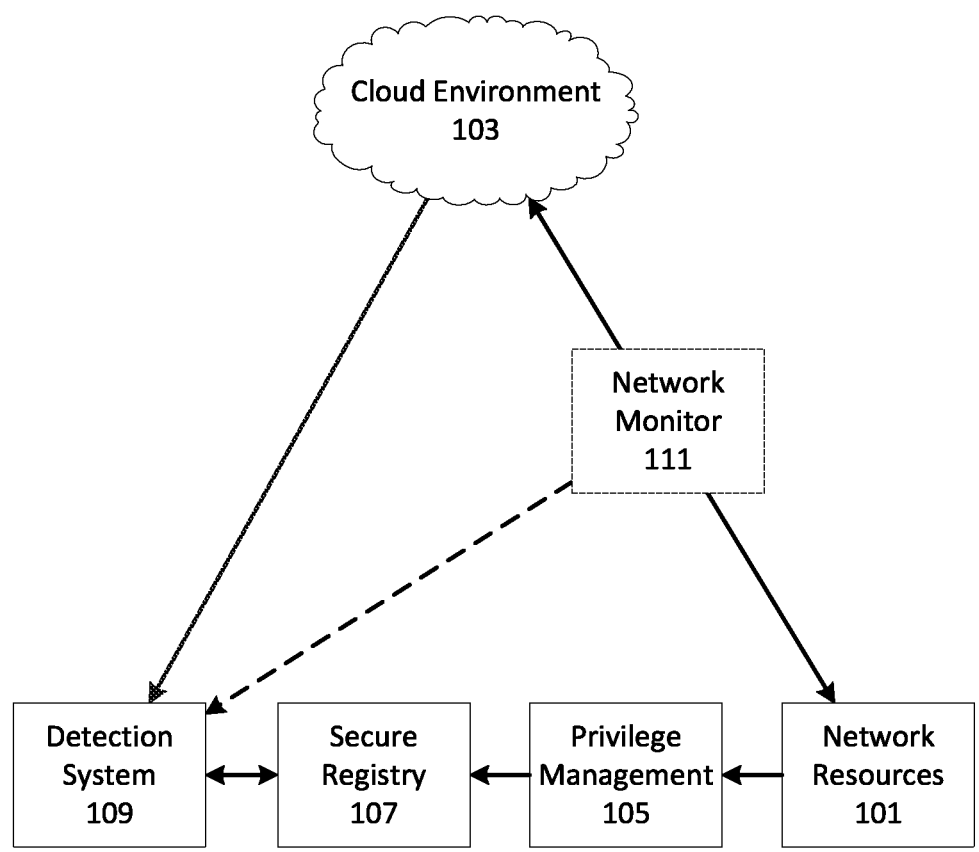
FIG. 1 depicts a schematic illustrating an exemplary system for detecting compromised access credentials.

FIG. 1 depicts an exemplary system 100 for detecting compromised access credentials, consistent with disclosed embodiments. System 100 can include network resources 101, such as services or applications configured to communicate with cloud environment 103 (e.g., with an application or other network resource operating in cloud environment 103). Cloud environment 103 can be configured to receive API calls from network resources 101. Access by network resources 101 to cloud environment 103 can be governed by policies generated, stored, and/or managed by privilege management 105. Secure registry 107 can be configured to store information regarding access tokens. In some aspects, this information can be generated by privilege management 105. Detection system 109 can be configured to access information gathered by cloud environment 103. Using this information, detection system 109 can determine whether access tokens for network resources 101 have been compromised. In some embodiments, detection system 109 can additionally or alternatively receive access information from network monitor 111. Network monitor 111 can be configured to intercept API communications (such as API calls) from network resources 101 to cloud environment 103. In this manner, system 100 can detect the improper use of access tokens. For example, system 100 can detect when access tokens are used through an unauthorized service or application. In some embodiments, system 100 can identify the improper action that triggered detection of the improper use of access tokens. For example, system 100 can be configured to identify the API communication, the source address for the API communication, one or more entities associated with that source address (e.g., when another user of cloud environment 103 is associated with the source address) and/or any prior API communications using these particular access tokens, or originating with the source address.

Similarly, system 100 can detect when access tokens are used in an authorized manner, for example in association with a API communication by an authorized application. In various embodiments, system 100 can perform active scanning to identify access tokens stored in unauthorized locations. Such scanning can also identify unmanaged access tokens, which may present a security risk.

As would be appreciated by one of skill in the art, the particular arrangement of components depicted in FIG. 1 is not intended to be limiting. Consistent with disclosed embodiments, system 100 can include additional components, or fewer components. For example system 100 may not include network monitor 111. Additionally, the components depicted in FIG. 1 may be combined or divided without departing from the envisioned embodiments. For example, a single component can perform the functionality of privilege management 105, secure registry 107, and detection system 109. Likewise, detection system 109 can be divided into detection components and remediation components. In some embodiments, privilege management 105, secure registry 107, and detection system 109 can comprise applications, programs, functions, or services executing on a single computing device, or on multiple computing devices. In various embodiments, privilege management 105, secure registry 107, and detection system 109 can be hosted on a cloud-computing environment, such as cloud environment 103 (e.g., a software as a service deployment). In certain embodiments, privilege management 105, secure registry 107, and detection system 109 can be deployed on the same network as network resources 101, or the same computing devices as network resources 101. For example, privilege management 105, secure registry 107, and detection system 109 can be deployed as agents on the computing devices executing network resources 101 (e.g., on the endpoints and servers), on a network gateway connecting network resources 101 to cloud environment 103, or on a private or public cloud environment hosting network resources 101 (e.g., a platform as a service or infrastructure as a service deployment).

Network resources 101 include applications that can communicate with cloud environment 103, consistent with disclosed embodiments. For example, network resources 101 can include applications invoking applications running in cloud environment 103, provide data or instructions to applications running in cloud environment 103, or receive results from applications running in cloud environment 103. As an additional example, network resources 101 may enable configuration of cloud environment 103. In particular, network resources 101 can include DevOps applications (e.g., TERRAFORM, CLOUDFORMATION, etc.) and security applications (e.g., CYBERARK). In some embodiments, an identity is associated with one or more of network resources 101. For example, different identities can be associated with each of network resources 101. In some aspects, network resources 101 can be associated with a single entity. For example, network resources 101 can be provided by, or on behalf of, a single natural or legal person. As an additional example, a bank can provide network resources 101. In some aspects, network resources 101 can be associated with multiple entities. For example, network resources 101 can be provided by, or on behalf of, a multiple natural or legal persons. As an additional example, network resources 101 can include all services or applications communicating with cloud environment 103, irrespective of the entities providing these services or applications.

Network resources 101 can communicate with cloud environment 103 using application programming interfaces (APIs) exposed by cloud environment 103. Network resources 101 can be configured to access these APIs using a command line interface or software development kit associated with cloud environment 103. For example, when cloud environment 103 includes AMAZON WEB SERVICES, then network resources 101 can be configured to use open source AWS API CLI/SDK tools. API communications can be constructed using access tokens. For example, an API communication can be encrypted or digitally signed using an access key, according to various methods. Network resources 101 can be configured to provide API communications using protocols, such as HTTP/HTTPs.

API communications can include information identifying the access token used to generate the API communication, consistent with disclosed embodiments. For example, the API communication can include a digital signature associated with the access token. In some embodiments, the digital signature can be generated by privilege management 105. In some instances, the digital signatures can differ between ones of network resources 101. For example, each of network resources 101 can have a unique digital signature. As an additional example, each API call of each of network resources 101 can have a unique digital signature. In some embodiments, the digital signatures can be encrypted according to various methods.

Identifying information can be included in HTTP/HTTPs fields of the API communication. For example, a "user agent" field could be added or modified to convey the identifying information in the HTTP/HTTPs request. Network resources 101, or another component of system 100 (e.g., privilege management 105 or network monitor 111) can be configured to modify the HTTP/HTTPs request to add or modify the "user agent" field. For example, such modification can be performed using the open source AWS API CLI/SDK tools. To prevent replay attacks the identifying information could include information specific to a particular request (e.g., a request time or a nonce). In some embodiments, the identifying information can be encrypted. For example, network resources 101 (another component of system 100) can be configured to encrypt digital signatures prior to insertion into the API communications. The particular HTTP/HTTPs field, or field in another communication protocol, is not intended to be limiting. One of ordinary skill in the art would recognize that suitable fields or protocols may differ between cloud environments.

API communications can also include information identifying the API communication, including at least one of a MAC address associated with the service, an IP address associated with the service, a name of the service, a name of a computing device associated with the service (e.g., a name of a computing device hosting the service), or a similar identifier.

Network resources 101, or another component of system 100 (e.g., privilege management 105 or network monitor 111) can be configured to use a public key infrastructure provided by system 100. Network resources 101, or another component of system 100 (e.g., privilege management 105 or network monitor 111) can be configured to sign API communications using a private key provided by system 100 (or externally). The API communication can be modified to include, or reference, a certificate provided by system 100. The certificate can be cryptographically bound to a public key corresponding to the private key. In some aspects, the certificate can identify the provider of the API communication. In various aspects, the certificate can identify the system. Cloud environment 103 can be configured to validate the certificate, according to various methods, and use the public key bound to the certificate to decrypt and validate the API communication.

Cloud environment 103 can include a cloud-computing platform, consistent with disclosed embodiments. Examples of suitable cloud-computing platforms include, but are not limited to, MICROSOFT AZURE, AMAZON WEB SERVICES, GOOGLE CLOUD PLATFORM, IBM CLOUD, and similar systems. Cloud environment 103 can be configured to validate API communications received from network resources 101. In some instances, cloud environment 103 can be configured to authenticate or authorize API communications using an access token. For example, network resources 101 can provide an API communication including a digital signature. This digital signature can be calculated over at least some of the API communication using an access key. Cloud environment 103 can be configured with a copy of the access key. Cloud environment 103 can use this copy to repeat the calculation of the digital signature. Cloud environment 103 can be configured to accept the API communication when the calculated digital signature matches the digital signature included in the API communication. Cloud environment 103 may then perform the action specified in the API communication. Cloud environment 103 can be configured to host one or more cloud applications. For example, could environment 103 could be configured to host a payroll application. The action specified in the API communication can affect the one or more cloud applications. For example, the action can include providing data or instructions to the cloud application, or requesting data or instructions from the cloud application. In the payroll example, the action can include specifying a payment in an amount to a recipient, or requesting an indication of payment amounts and payment recipients for previous payments.

Cloud environment 103 can be configured to log API communications or related information. In some embodiments, cloud environment 103 can be configured to log the information identifying the API communication. For example, cloud environment 103 can be configured to log at least one of an access key ID, a name of the API, a request time, a MAC address associated with the service, an IP address associated with the service, a name of the service, a name of a computing device associated with the service (e.g., a name of a computing device hosting the service), or similar identifiers. As an additional example, cloud environment 103 can be configured to log information identifying the access token. For example, cloud environment 103 can be configured to log a digital signature associated with the access token. Cloud environment 103 can be configured to use existing applications to log API communications (e.g., AWS CLOUDTRAIL LOGS). In some embodiments, system 100 can modify an API communication to include a digital signature associated with an access token, send the API communication to cloud environment 103, and then assess whether the access token is compromised using the logged digital signatures.

Privilege management 105 can be configured to generate information for detecting potentially compromised access tokens, consistent with disclosed embodiments. Privilege management 105 can provide this information to network resources 101, or another component of system 100, for insertion into an API communication. Additionally or alternatively, privilege management 105 can provide this information to secure registry 107 for detection of compromised access tokens. In some embodiments, the information can include digital signatures associated with access tokens. These digital signatures can differ between identities. For example, a digital signature can be specific to a user, a service, or a combination of user and service. Additionally or alternatively, digital signatures can differ between access tokens. For example, a first digital signature can be associated with a first access token and a second digital signature can be associated with a second access token. In some aspects, privilege management 105 can be configured to encrypt the digital signatures according to various methods. In some embodiments, the information can include at least one of an access key ID, a name of the API, a MAC address associated with the service, an IP address associated with the service, a name of the service, a name of a computing device associated with the service (e.g., a name of a computing device hosting the service), or similar identifiers.

Privilege management 105 can be configured to receive policy information concerning access tokens and services. In some embodiments, policy management 105 can be configured to receive policy information while generating information for detecting potentially compromised access tokens. For example, privilege management 105 can be configured to provide a graphical user interface. By interacting with this graphical user interface, a user can provide or modify policy information. For example, a user can indicate APIs, MAC addresses, services, IP addresses, and computing devices permitted to use access tokens. In some embodiments, the user can indicate permitted locations for access tokens. These indications can concern individual access tokens, or multiple access tokens. Privilege management 105 can be configured to provide policy information to secure registry 107.

Secure registry 107 can be configured to store information for detecting potentially compromised access tokens, consistent with disclosed embodiments. For example, secure registry 107 can be configured to store digital signatures associated with access tokens. As an additional example, secure registry 107 can be configured to store at least one of an access key ID, a name of the API, a MAC address associated with the service, an IP address associated with the service, a name of the service, a name of a computing device associated with the service (e.g., a name of a computing device hosting the service), or a similar identifier. As an additional example, secure registry can be configured to store policy information concerning permitted locations of access tokens. In some embodiments, secure registry 107 can be configured to receive information from privilege management 105. In various embodiments, secure registry 107 can be configured to communicate information to detection system 109. This information can be communicated in response to requests from detection system 109. In some aspects, secure registry 107 can be a secure credential vault (e.g., provided by CYBERARK). For example, secure registry 107 can include a database configured to store and manage cryptographic keys and credential information such as passwords. In some aspects, a host of cloud environment 103 can be configured to maintain secure registry 107. For example, the same computing devices used to maintain cloud environment 103 can be used to maintain secure registry 107. As an additional example, cloud environment 103 can be configured to run secure registry 107 as a cloud-based application.

In some embodiments, network resources 101 can be configured to "check-out" access tokens from secure registry 107 when building API communications to cloud environment 103. For example, secure registry 107 can be configured to receive a request to provide a digital signature for an access token to network resources 101. Secure registry 107 can be configured to determine, based on at least one of information received with the request and information stored by secure registry 107, that this request is proper. The received and stored information can include one or more of an access key ID, a name of the API, a MAC address associated with the service, an IP address associated with the service, a name of the service, a name of a computing device associated with the service (e.g., a name of a computing device hosting the service), or a similar identifier. Secure registry 107 can be configured to provide the digital signature in response to the request. In some instances, secure registry 107 can be configured to record details of the request (e.g., that the access token was "checked-out" by a particular service for a particular API communication at a particular time).

Secure registry 107 can be configured to store permitted location information for access tokens. For example, secure registry 107 can be configured to store default location information, directory information, path information, file information, and/or computing device identification information describing one or more permitted locations for access tokens used by network resources 101.

Detection system 109 can be configured to detect potentially compromised access tokens, consistent with disclosed embodiments. Detection system 109 can be configured to detect potentially compromised access tokens once, repeatedly, or periodically. Detection system 109 can be configured to perform such detection on-demand or automatically. In some aspects, detection system 109 can be configured to automatically detect potentially compromised access tokens in response to an indication of potentially improper access credential use or activity. In some aspects, potentially improper access credential uses or activities can include abnormal API communications, abnormal source addresses for API communications, and abnormal sequences of API communications. In these examples, "abnormal" can be determined with regards to records (e.g., lists of previously used endpoints, IP addresses, API communication types, and sequences of API communications) or metrics (e.g., empirically obtained distributions describing the usage frequency of endpoints, IP addresses, API communication types, and sequences of API communications). In some aspects, an indication of potentially improper access credential use or activity could be received by detection system 109 from another component of system 100 (e.g., network resources 101, cloud environment 103, or network monitoring system 111). For example, detection system 109 could be configured to receive an indication of a sudden increase in requests to create new cloud resources, such as cloud-based applications or infrastructure (e.g., virtual machines, load balancers, gateways, etc.), or delete existing cloud resources. As an additional example, detection system 109 can be configured to receive an indication that cloud-based applications or infrastructure have been directed to copy substantial amounts of data to a particular target (e.g. an unrecognized machine name, endpoint, or address).

Detection system 109 can be configured to access logs of API communications to detect potentially compromised access tokens. The logs of API communications can be generated by cloud environment 103, or another component of system 101 (e.g., network monitor 111). These logs can include information identifying the access token used to generate the API communication. For example, the logs can include fields for at least one of a digital signature associated with an access token, an access key ID, a name of the API, a request time, a MAC address associated with the service, an IP address associated with the service, a name of the service, a name of a computing device associated with the service (e.g., a name of a computing device hosting the service), or a similar identifier.

Detection system 109 can be configured to compare the identifying information to information for identifying compromised access tokens stored in secure registry 107. For example, detection system 109 can access secure registry 107 to determine whether secure registry 107 includes matching information for an API communication. As an additional example, when the access log includes a digital signature, detection system 109 can be configured to access secure registry 107 to determine whether that digital signature is associated with an access token. Detection system 109 can also determine whether the correct digital signature was inserted into the API communication. Detection system 109 can also access secure registry 107 to determine whether the digital signature was "checked-out" to the particular service, for the particular API communication, at the time of the API communication, etc.

Detection system 109 can be configured to detect potentially compromised access tokens as network resources 101 communicate with cloud environment 103. For example, cloud environment 103 can be configured to log API communications as they occur. Detection system 109 can be configured to compare API communications to information stored in secure registry 107 as they are logged. For example, detection system 109 can be configured to detect potentially compromised access tokens in real-time (e.g., within a second or less, a minute, or an hour of an API communication made with the compromised access tokens).

Detection system 109 can be configured to take remedial action when an API communication lacks identifying information, or the identifying information does not match the information stored in secure registry 107. In some embodiments, detection system 109 can be configured to provide an alert following detection of a compromised or potentially compromised access token. For example, detection system 109 can be configured to provide a GUI prompt, email, SMS message, automated phone call, or other notification to one or more administrators or users of system 100. This alert can indicate at least one of the identity, the access key, the API, and the service implicated in the improper API communication. In some embodiments, detection system 109, or another component of system 100, can be configured to take automatic mitigation steps after detecting potentially compromised access tokens. Such automatic mitigation steps can include, for example, rotating the access token, disabling the access token, storing a copy of at least a portion of the logs (e.g., the portion recording API communications using a potentially compromised access token), providing forensics information on actions taken in cloud environment 103 using the potentially compromised access token, etc. For example, when the improper API communication concerned deleting a virtual machine, detection system 109 can be configured to indicate which virtual machine was deleted (or which virtual machine was indicated for deletion), whether a backup of this virtual machine exists, the source IP address of the improper API communication, any prior API communications received from this source IP address, any prior actions taken by the entity associated with this source IP address (if known), and/or any prior actions taken using the access token associated with the improper API communication.

Detection system 109, or another component of system 100, can also be configured to actively scan a plurality of network resources for cloud credentials, consistent with disclosed embodiments. The plurality of network resources can be separate from cloud environment 103 or contained within it. For example, the plurality of network resources can encompass one or more computing devices hosting network resources 101. By actively scanning the network, detection system 109 can detect access tokens in non-authorized locations. In some embodiments, detection system 109 can be configured to compare the location of identified access tokes with policy information stored in secure registry 107. In some embodiments, detection system 109 can be configured to scan physical assets, such as network-connected computing devices (e.g., servers, desktops, laptops, mobile devices, wearable devices, Internet of Things Devices) and virtual assets, such as endpoints exposed by the plurality of network resources and cloud-computing infrastructure.

Detection system 109, or another component of system 100, can also be configured to actively scan the plurality of network resources independent of any attempt by network resources 101 to request access to cloud environment 103. In some embodiments, active scanning can be performed remotely. For example, a central server can be configured to connect to the network resources and request information. The central server can then receive the information from the connected network resources 101 and perform the scan on the received information. In various embodiments, active scanning can be performed locally. For example, system 100 can distribute agents that run locally on the scanned computing devices. These local agents can scan the computing devices on which they run for access tokens. The results of these scans can be provided to detection system 109, or another component of system 100. Such active scans can be run once, repeatedly, or periodically.

Detection system 109, or another component of system 100, can be configured to actively scan one or more of cloud-specific storage locations, machine memories, and local files and registry keys. Detection system 109 can be configured to access secure registry 107 to compare the locations of access tokens identified during an active scan with permitted locations for those access tokens. When detection system 109 determines that an access token is not registered to secure system 107, or determined that an access token is not located in a proper location, detection system 109 can be configured to provide an alert. As discussed above, for example, detection system 109 can be configured to provide a GUI prompt, email, SMS message, automated phone call, or other notification to one or more administrators or users of system 100. This alert can indicate at least one of the identity, the access token, and the network resource implicated in the improper access token storage location, etc. In some embodiments, detection system 109, or another component of system 100, can be configured to take automatic mitigation steps after detecting improperly stored access tokens. Such automatic remedial action can include, for example, rotating the access token, disabling the access token, storing a copy of at least a portion of a logs (e.g., a portion recording API communications using the potentially compromised access token), and providing forensics information (such as the forensics information described above) regarding actions taken in cloud environment 103 using the improperly stored access token.

Detection system 109, or another component of system 100, can be configured to actively scan default storage locations for access tokens. As would be appreciated by one of skill in the art, different cloud computing environments can specify different default storage locations for access tokens. These locations can be specified in software development kits provided for use with each cloud computing environment. For example, the AMAZON WEB SERVICES cloud environment specifies several default credentials storage locations. When building API calls using the AMAZON WEB SERVICES SDK, default locations can be searched in a hierarchical order. These default locations include environmental variables maintained by the SDK (e.g., AWS_ACCESS_KEY_ID=<access_key> and AWS_SECRET_ACCESS_KEY=<secret_key>), shared credentials files (e.g., "%UserProfile%\.aws\credentials"), and IAM Roles (e.g., a local-running cloud application can obtain access tokens by querying Instance (AWS AMI/VM) metadata service on an Amazon EC2 instance).

Detection system 109, or another component of system 100, can be configured to actively scan computing device memories using templates. Access tokens can have a specific structure, which can be used to generate templates. The raw memory of a machine can be searched for data matching these templates. As discussed above, this search can be performed by a central server, or by local agents running on the machines scanned. Additionally, this search can be performed once, repeatedly, or periodically. In some instances, this search can be performed upon connection of a computing device to the network.

Detection system 109, or another component of system 100, can be configured to actively scan local files and registry keys on a storage disk, such as a storage disk of a computing device on a network, or a network-attached storage device. The local files and registry keys of the computing device can be searched for data matching templates, as described above. As discussed above, this search can be performed by a central server, or by local agents running on the machines scanned. Additionally, this search can be performed once, repeatedly, or periodically. In some instances, this search can be performed upon connection of a computing device to the network.

Network monitor 111 can be configured to intercept API communications from network resources 101 to cloud environment 103, consistent with disclosed embodiments. In some embodiments, network monitor 111 can be configured as gateway or proxy connecting a network hosting network resources 101 and cloud environment 103. Network monitor 111 can be configured to analyze API communications sent by network resources 101 for cloud environment 103. Network monitor 111 can provide information concerning such API communications to detection system 109. As described above, detection system 109 can be configured to compare the identifying information for an API communication to information for identifying compromised access tokens stored in secure registry 107. In some embodiments, the network hosting network resources 101 can be configured to host PKI/CA (Public-key infrastructure/certificate authority) mechanisms. Network resources 101, or another component of system 100, can be configured to sign API communications using a private key associated with a certificate provided by the certificate authority. A certificate containing a matching public key can be included in, or referenced by, the API communication. Network monitor 111 can be configured to verify the certificate and validate the message using the public key. When an API communication does not match stored information in secure registry 107, detection system 109 can be configured to provide an alert or to take remedial action, as discussed above. Additionally, detection system 109 can be configured to instruct network monitor 111 not to pass improper API communications to cloud environment 103. For example, detection system 109 can receive identifying information for an API communication from network monitor 111, determine that the API communication is improper, and instruct network monitor 111 to block or drop the API communication without forwarding it to cloud environment 103. In some embodiments, network monitor 111 can be configured to run on cloud environment 103, rather than as a gateway or proxy external to cloud environment 103. For example, cloud environment 103 can be configured to route API communications from network resources 101 to network monitor 111.

In various embodiments, network monitor 111 can be configured as one or more local agents running on computing devices hosting network resources 101. The local agents can be configured to perform the functions of detection system 109, or can be configured to provide information to detection system 109. The local agents can be configured to compare the identifying information for an API communication to information for identifying compromised access tokens stored in secure registry 107. When an API communication does not match stored information in secure registry 107, the local agents can be configured to provide an alert or to take remedial action. When an API communication matches stored information in secure registry 107, the local agent can be configured to sign the API communications and provide them to cloud environment 103. Cloud environment 103 can be configured to use the signatures provided by the local agents to validate the API calls, for example using a shared symmetric key or a public key. The symmetric key can be associated with system 100, or with the specific local agent signing the API. The local agent can be configured to insert a certificate associating an identity with the API communication into the API communication before forwarding the API communication to cloud environment 103.

Figure 2:
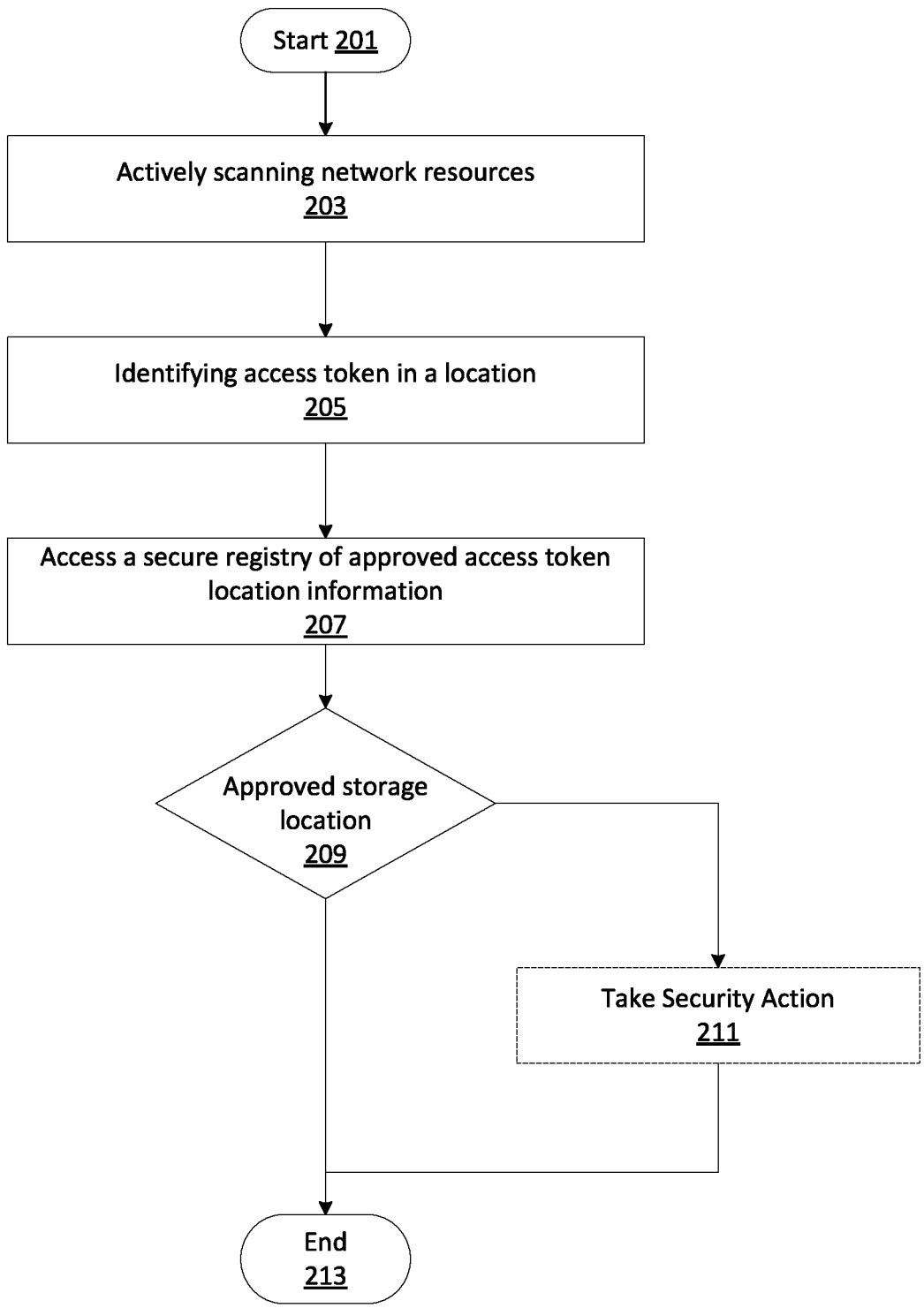
FIG. 2 depicts an exemplary method 200 for actively scanning network resources to identify improperly stored access tokens.

FIG. 2 depicts an exemplary method 200 for actively scanning network resources 101 to identify improperly stored access tokens, consistent with disclosed embodiments. According to method 200, system 100 can be configured to actively scan network resources 101, identify an access token in a location, access secure registry 107, determine whether the identified access token is stored in an approved storage location, and take security action as necessary. In this manner, method 200 can allow system 100 to combat improper storage of access tokens. For example, when method 200 identifies access tokens registered to a permitted location by privilege management 105, or another component of system 100, outside the permitted location, then these credentials may have been stolen and used in a malicious process.

After starting in step 201, method 200 can proceed to step 203. In step 203, system 100 can actively scan a plurality of network resources (e.g., network resources 101). The plurality of network resources can be configured to request access to one or more cloud applications (e.g., a payroll application) executable in the cloud environment (e.g., cloud environment 103). In some embodiments, the active scanning can be performed by a server. In various embodiments, the active scanning can be performed by local agents executing on the computing devices hosting the plurality of network resources. The network hosting the plurality of network resources can be separate from the cloud environment or contained within it. In some aspects, the active scan can be ongoing, periodic, or initiated in response to an indication of improper access token use or activity. As described above, potentially improper access credential uses or activities can include abnormal API communications, abnormal source addresses for API communications, and abnormal sequences of API communications.

In some embodiments, the active scan can be configured to cover assets (e.g., technological assets) of a particular entity. The active scan can be configured to cover assets located on a cloud environment associated with the particular entity (and distinct from cloud environment 103). For example, the active scan can be configured to cover physical assets, such as network-connected computing devices (e.g., servers, desktops, laptops, mobile devices, wearable devices, Internet of Things Devices) and virtual assets, such as endpoints exposed by the plurality of network resources and cloud-computing infrastructure.

As described above, an active scan can include (non-exclusive) categories of locations: default locations, raw computing device memories, and local files and registry keys. Default locations can be specified by a cloud software development kit of a cloud environment provider. For example, default locations can include environment variables, shared credentials files, and IAM Roles. Access tokens have predetermined formats depending on the cloud environment provider. For example, access keys for AMAZON WEB SERVICES can start with "AKIA" or "ASIA" and can have a the length of 20 characters (e.g., AKIAIVGDHG4GBEXAMPLE). Furthermore, system 100 can be configured to search for access tokens matching those registered to the secure registry 107. For example, detection system 109 can be configured to retrieve information concerning registered access tokens from secure registry 107 and perform an active scan of the plurality of network resources for the registered access tokens. Thus the active scan can involve scanning the raw computing device memory for data matching a registered access token or a template based on a known access token format. In some aspects, the active scan can include local files and registry keys on a computer-readable storage medium of the particular entity. In further aspects, system 100 can be configured to actively scan physical and virtual assets as they are connected or added to a network to identify stored, embedded, or contained access tokens.

After step 203, method 200 can proceed to step 205. In step 205, system 100 can identify one or more access tokens in a location. This identification can be based on the results of the active scan of the plurality of network resources performed in step 203. For example, system 100 can identify a first access token in a first location on a first network resource. This first access token may be identified in a default location, raw memory, file structure, or key registry. This first access token can enable a first identity to use the first network resource to request access to a first cloud application executable in cloud environment 103. For example, the first access token can be used to build a valid API communication to cloud environment 103. In some aspects, this first access token can be specific to at least one of a particular identity, network resource (e.g., service or application), or type of API communication. For example, the access token can be specific to the combination of identity and network resource. System 100 can identify multiple access tokens in this manner, with similar characteristics. For example, system 100 can also identify a second access token in a second location on a second network resource. This second access token can enable a second identity to use the second network resource to request access to a second cloud application executable in cloud environment 103. This second access token can be specific to at least one of a particular identity, network resource (e.g., service or application), or type of API communication.

After step 205, method 200 can proceed to step 207. In step 207, system 100 can access a secure registry of approved access token location information. For example, in some embodiments, detection system 109 can access secure registry 107. Detection system 109 can access secure registry 107 using an application programming interface, a remote procedure call, a function call, or through various other methods. In some aspects, secure registry 107 can be configured to store identifying information for access tokens. For example, secure registry 107 can identify a plurality of access tokens and a plurality of corresponding locations where the plurality of access tokens are permitted to be stored. In some embodiments, the plurality of access tokens and corresponding locations can be stored in secure registry 107 by another component of system 100 (e.g., privilege manager 105).

In some aspects, the plurality of corresponding locations in the secure registry can identify a plurality of IP addresses where the plurality of access tokens are permitted to be stored. For example, these IP addresses can correspond to network resources authorized to access cloud environment 103. As an additional example, these IP addresses can be associated with a single entity (e.g., a particular organization or individual). As a further example, these IP addresses can be associated with a particular service or application. These IP addresses can be physical or virtual IP addresses.

In some aspects, the plurality of corresponding locations in the secure registry can identify a plurality of MAC addresses where the plurality of access tokens are permitted to be stored. These MAC addresses can correspond to physical assets (e.g., NAS storage, servers, desktops, laptops, mobile devices, wearable devices, IoT devices). These MAC addresses can be associated with a single entity (e.g., a particular organization or individual). As a further example, these MAC addresses can be associated with a particular service or application.

In some aspects, the plurality of corresponding locations in the secure registry can identify a plurality of names of network resources (e.g., Determinist, Eschatologist, Revisionist) on which the plurality of access tokens are permitted to be stored. For example, a server attached to a network of an entity may be named for convenience purposes, and system 100 can use this name to identify the server as a permitted location for access tokens.

In various aspects, the plurality of corresponding locations where the plurality of access tokens are permitted to be stored can be determined as part of a process that created the plurality of access tokens. For example, cloud environment 103 can be configured to provide a graphical user interface for associating permitted locations with access tokens. This graphical user interface can be provided as part of the process of creating the access tokens. For example, a user configuring an AMAZON WEB SERVICES account may be prompted to specify one or more permitted locations for the access tokens. Additionally or alternative, cloud environment 103 can be configured to specify permitted locations automatically, as part of the process that creates the plurality of access tokens. In some embodiments, cloud environment 103 can be configure to provide an indication of the corresponding locations to another component of system 103 (e.g., privilege manager 105 or secure registry 107). In some aspects, a user can interact with privilege manager 105, causing privilege manager 105 to interact with cloud environment 103 to create the plurality of access tokens. Then privilege manager 105 can be configured to provide a graphical user interface for associating permitted locations with access tokens, or to specify permitted locations automatically.

After step 207, method 200 can proceed to step 209. In step 209, system 100 can determine whether the location of an access token is an approved storage location. This determination can be based on information received from secure registry 107. For example, detection system 109 can retrieve permitted locations for an access token from secure registry 107. Detection system 109 can compare these permitted locations to the location identified in step 205. For example, detection system 109 can compare the IP address, MAC address, or network resource name of a first access token, identified during the active scan, with the permitted IP address, MAC address, or network resource name retrieved from the secure registry 107. Based on this comparison, detection system 109 can determine that the first location is an approved storage location for the first access token. Similarly, based on such a comparison, detection system 109 can determine that a second location is not an approved storage location for a second access token. For example, secure register 107 can include information identifying a network resource named "Determinist" as a permitted location for the first and second access tokens. But detection system 109 may determine that the first access token is located on this network resource and the second token is located on a network resource named "Eschatologist." Thus the storage location for the first access token may be proper and the storage location for the second access token may be improper, even when the first and second access tokens are the same access token (or have the same value) because the first storage location and the second storage location differ. As an additional example, secure registry 107 can include information identifying a network resource named "Determinist" as a first permitted location for the first access token and a network resource named "Eschatologist" as a second permitted location for the second access token. But detection system 109 may determine that the first access token and the second access token are both located on the network resource named "Determinist." Thus the storage location for the first access token may be proper and the storage location for the second access token may be improper, even when the first storage location and the second storage location are the same, because the first and second access tokens have different proper locations.

After step 209, method 200 can proceed to step 211. In step 211, system 100 can take a security action, such as generating an alert or taking a remedial action, as discussed above. In some aspects, the security action can be performed automatically. In other aspects, the security action can require human intervention (e.g., human authorization). For example, detection system 109 can generate an alert, such as a GUI prompt, email, SMS message, automated phone call, or other notification. The alert can be provided to one or more administrators or users of system 100. This alert can indicate at least one of the identity, the access key, the API, and the service implicated in the improper API communication. To continue the prior example, when the second token is improperly stored, detection system 109 can generate an alert identifying the second location of the second access token.

In some embodiments, detection system 109, or another component of system 100, can be configured to take automatic mitigation steps after detecting potentially compromised access tokens. Such automatic mitigation steps can include, for example, rotating the access token, disabling the access token, storing a copy of at least a portion of the logs (e.g., the portion recording API communications using a potentially compromised access token), providing forensics information (such as the forensics information described above) on actions taken in cloud environment 103 using the potentially compromised access token, etc. To continue the prior example, when the second token is improperly stored, detection system 109 can invalidate the second access token, monitor attempted communications activity from the second network resource to the cloud environment, and/or investigate the second network resource's past use of the second access token in communications with the cloud environment. After step 211, method 200 can proceed to terminate at step 213.

Figure 3:
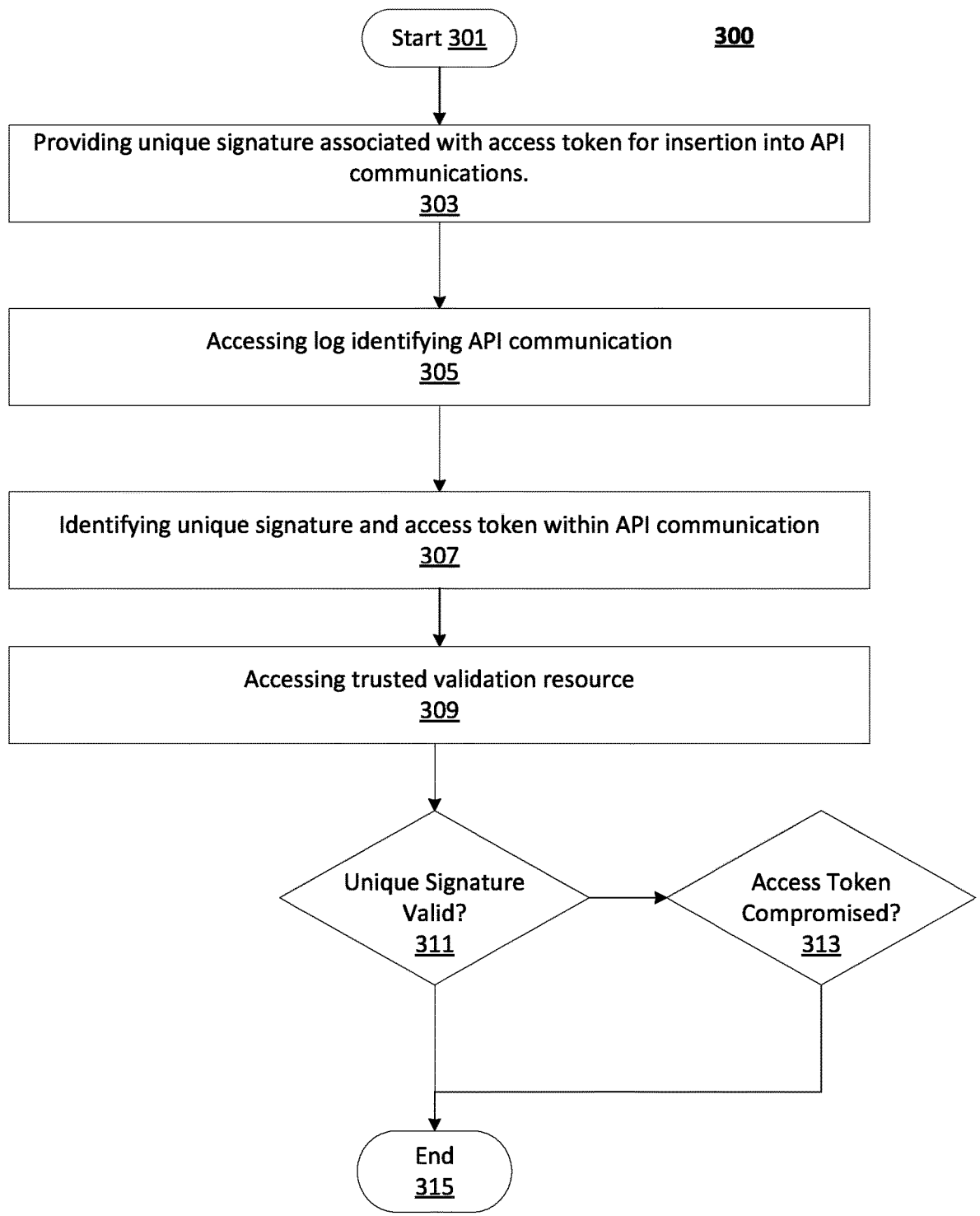
FIG. 3 depicts an exemplary method for detecting and responding to compromised access credentials.

FIG. 3 depicts an exemplary method 300 for identifying potentially compromised access information, consistent with disclosed embodiments. According to method 300, system 100 can be configured to analyze access tokens used by network resources 101, determine whether access tokens used by network resources 101 have been registered with privilege management 105, identify usage of unregistered access tokens, or improper usage of registered access tokens, and take appropriate security actions. In this manner, system 100 can analyze access tokens as they are used and evaluate permissions and access policies controlling the use of these access tokens. The use of access tokens contrary to the permissions and access policies controlling them could signal an attack, a misconfiguration of the network, or poor application design. Regardless, the use of access tokens contrary to the permissions and access policies controlling them presents significant risks for a user of cloud environment 103.

After starting at step 301, method 300 can proceed to step 303. In step 303, system 100, or a component of system 100 (e.g., privilege management 105) can provide a digital signature associated with an access token for insertion into API communications. In various embodiments, the digital signature can be unique to the identity, the network resource, the identity and the network resource, or the API communication. In some aspects, privilege management 105 can provide the digital signature to network resources 101. In some embodiments, privilege management 105 can be configured to provide the digital signature to network resources 101 in response to a request from network resources 101. In some embodiments, the digital signature can be provided to an agent running on network resource 101.

Network resources 101 can insert a digital signature into API communications sent to a cloud application executable in cloud environment 103. When the digital signature is provided to an agent running on network resource 101, the agent can insert the digital signature into the API communications. The API communications can include API communications to cloud environment 103, as discussed above.

Network resources 101 can provide the API communications to cloud environment 103. In some aspects, network resources 101 can provide the digital signature to cloud environment 103 in a field of a hypertext transfer protocol-formatted request. In various aspects, the digital signature can be encrypted using a private key before it is provided to network resource 101. For example, privilege manager 105, or another component of system 100 (e.g., detection system 109), can be configured to maintain a certificate authority, generating certificates including a public key and signing the digital signature using a corresponding private key. Cloud environment 103 can verify these certificates according to various methods. Cloud environment 103 can use the public keys to decrypt the digital signature, allowing for verification of the digital signature.

The digital signature can be associated with an access token. For example the digital signature can be associated with an access key used to digitally sign the API communications. In some aspects, the association can be generated by privilege manager 105. In various aspects, the association can be generated by cloud environment 103.

The access token can be associated with a particular identity. For example, system 100 can be configured to allow the particular identity to use the access token to request access to the cloud application. For example, an organization can have an account with a cloud services provider. The cloud services provider can provision the account of the organization with access keys. A client program running on a network of the organization can catch API communications to a cloud environment of the cloud provider and digitally sign them using the access keys. The cloud environment can verify the digital signatures using copies of the access keys, and can execute the verified API communications to affect cloud application executable in the cloud environment.

In some aspects, system 100 can provide the digital signature to network resource 101 as part of a process that generated the access token. For example, privilege management 105 can be configured interact with cloud environment 103 and a user or another system to generate the access token. Privilege management 105 can then register the access token by creating the digital signature and storing the digital signature in the secure registry 107. Privilege management 105 can also provide the digital signature to network resource 101 for insertion in API communications. In some embodiments, cloud environment 103 can generate the digital signature and the access token. Cloud environment 103 can provide the digital signature and the access token to privilege management 105.

In some aspects, system 100 can be configured to provide the digital signature to network resources 101 after the identity has been authenticated to cloud environment 103 and after the access token has been generated. For example, cloud environment 103 can authenticate the identity and provide at least one access token to network resources 101. Privilege management 105 can then interact with cloud environment 103 and/or network resources 101 to retrieve the at least one access token. Privilege management 105 can then register the access token by creating the digital signature and storing the digital signature in the secure registry 107. After registering the access token, privilege management 105 can provide the digital signature to network resources 101 for insertion in API communications.

After step 303, method 300 can proceed to step 305. In step 305, system 100, or a component of system 100 (e.g., detection system 109) can access a log identifying an API communication sent to cloud environment 103 from network resources 101. In some aspects, detection system 109 can access the log on an ongoing basis, periodically, or in response to an indication of improper access token use or activity. As described above, potentially improper access credential uses or activities can include abnormal API communications, abnormal source addresses for API communications, and abnormal sequences of API communications. The log can be associated with cloud environment 103, as discussed above. For example, cloud environment 103 can compile the log (e.g., when cloud environment 103 is AMAZON WEB SERVICES, the log can be compiled using AWS CLOUDTRAIL). In some embodiments, the log can be compiled by another component of system 100 (e.g., network monitor 111 or network resources 101) and provided to detection system 109. For example, such a component can be configured to indicate API communications originated by network resources 101 or intercepted by network monitor 111. In some aspects, the log can identify the API by including information concerning the API. For example, the log can include the digital signature and the access token used to access cloud environment 103. In various aspects, the log can include additional information identifying the API communication. For example, cloud environment 103 can be configured to log at least one of an access key ID, a name of the API, a request time, a MAC address associated with the service, an IP address associated with the service, a name of the service, a name of a computing device associated with the service (e.g., a name of a computing device hosting the service), or similar identifiers.

After step 305, method 300 can proceed to step 307. In step 307, system 100, or a component of system 100 (e.g., detection system 109) can parse identifying information from the log. For example, detection system 109 can parse identifying information from an API communication stored in the log. In various aspects, the identifying information can be the digital signature and the access token. In some aspects, the identifying information can be other information concerning the API communication, such as an access key ID, a name of the API, a request time, a MAC address associated with the service, an IP address associated with the service, a name of the service, a name of a computing device associated with the service (e.g., a name of a computing device hosting the service), or similar identifiers. In some embodiments, the identifying information can be stored as one or more fields in the log.

After step 307, method 300 can proceed to step 309. In step 309, system 100, or a component of system 100 (e.g., detection system 109) can access a trusted validation resource. In some aspects, the trusted validation resource can be a secure network vault (e.g., secure registry 107). In some embodiments, the trusted validation resource can store digital signature information associated with the access token. In various aspects, the trusted validation resource can store additional information identifying the API communication. For example, the trusted validation resource can store at least one of an access key ID, a name of the API, a request time, a MAC address associated with the service, an IP address associated with the service, a name of the service, a name of a computing device associated with the service (e.g., a name of a computing device hosting the service), or similar identifiers. In some aspects, detection system 109 can be configured to retrieve the digital signature and/or additional identifying information from the trusted validation resource.

After step 309, method 300 can proceed to step 311. In step 311, system 100, or a component of system 100 (e.g., detection system 109) can determine whether the digital signature is valid. In some embodiments, the digital signature may be encrypted and detection system 109 can decrypt the digital signature prior to validation. Detection system 109 can be configured to compare the digital signature identified in the log to the digital signature retrieved from the trusted validation resource. Similarly, in some embodiments, detection system 109 can be configured to compare at least some of the additional identifying information stored in the log with the additional identifying information stored in the trusted validation resource. In some embodiments, based on the comparison of the digital signatures, detection system 109 can determine whether the digital signature is valid. For example, the digital signature in the logged API communication can be valid when it matches the digital signature in the trusted validation resource. In various embodiments, based on the comparison of the additional identifying information between the logged API communication and the trusted validation resource detection system 109 can determine whether the API communication was valid.

After step 311, method 300 can proceed to step 313. In step 313, system 100, or a component of system 100 (e.g., detection system 109) can determine, based on whether the digital signature is valid, whether the access token is potentially compromised. For example, when the digital signatures do not match (or in some embodiments when the additional identifying information does not match) detection system 109 can determine that the access token is potentially compromised.

In some embodiments, method 300 can further include nullifying the access token. System 100 can nullify the access token when it determines that the access token is compromised, or potentially compromised. For example, detection system 109 can communicate with cloud environment 103 to nullify the access token. As an additional example, detection system 109 can instruct network resources 101 to communicate with cloud environment 103 to nullify the access token.

In various embodiments, method 300 can further include rotating the access token. System 100 can rotate the access token when it determines that the access token is compromised, or potentially compromised. As would be understood by one of skill in the art, key rotation can include generation and use of a new access token in place of the prior access token. In some aspects, detection system 109 can communicate with cloud environment 103 to nullify the access token. As an additional example, detection system 109 can instruct network resources 101 to communicate with cloud environment 103 to nullify the access token.

In various embodiments, method 300 can further automatically generating a forensics report regarding activity associated with an access token. System 100 can generate the forensics report when it determines that the access token is compromised, or potentially compromised. In some aspects, the forensic report can be generated using data generated by cloud environment 101, network monitor 111, a secure credential vault, or another component of system 100. For example, the forensic report can be generated using data from secure storage 107. In some aspects the data can be API communication logs. In some aspects, detection system 109 can communicate with cloud environment 103 or network monitor 111 to retrieve at least a portion of the API communication logs. The retrieved portion of the API logs can concern the compromised, or potentially compromised access token. After step 313, method 300 can terminate at step 315.

Figure 4:
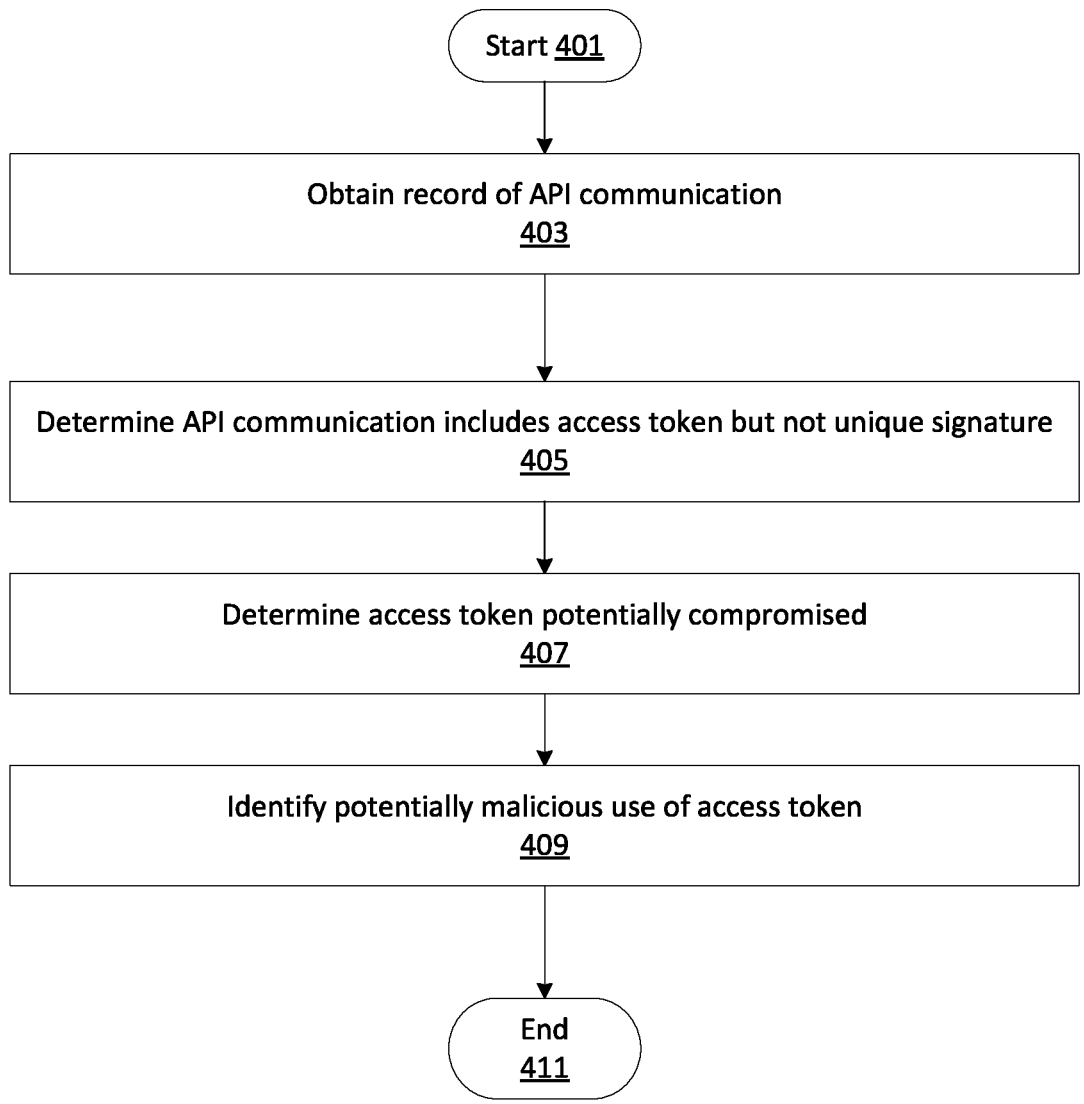
FIG. 4 depicts an exemplary method 400 for identifying unmanaged access information.

FIG. 4 depicts an exemplary method 400 for identifying unmanaged access information, consistent with disclosed embodiments. According to method 400, system 100 can obtain a record of an API communication, determine that the API communication includes an access token but not a digital signature, determine that the access token is potentially compromised, and identify that the access token is potentially used maliciously. In this manner method 400 allows for detection of unmanaged or stolen access credentials, which could otherwise pose a security risk to the network environment of system 100.

After starting at step 401, method 400 can proceed to step 403. In step 403, detection system 109 can obtain a record of an API communication. This API communication can be between network resources 101 and cloud environment 103. In some embodiments, detection system 109 can obtain the record by accessing a log associated with cloud environment 103. For example, the log can be generated by cloud environment 103 logging API communications received from network resources 101. The log can identify the API communication, for example by including a digital signature or additional identifying information as discussed herein. In various embodiments, detection system 109 can obtain the record from network monitor 111. In some aspects, network monitor 111 can be hosted by the same computing devices as cloud environment 103, network resources 101, or detection system 109. In some aspects, network monitor 111 can be configured to intercept the API communication sent from network resource 101 and directed to cloud environment 103. Network monitor 111 can perform this interception without reference to a log of API communications. For example, though cloud environment 103 may be configured to log API communications, network monitor 111 can intercept the API communications without reference to this log. In some aspects, detection system 109 can obtain such records on an ongoing basis, periodically, or in response to an indication of improper access token use or activity. As described above, potentially improper access credential uses or activities can include abnormal API communications, abnormal source addresses for API communications, and abnormal sequences of API communications.

After step 403, method 400 can proceed to step 405. In step 405, detection system 109 can determine that the API communication includes an access token but not a digital signature. As described herein, in some embodiments network resources 101 can be configured to request a digital signature from privilege management 105 when building an API communication for sending to digital environment 103. This digital signature can be inserted into the API communication, as discussed above. The absence of such a digital signature can therefore indicate that privilege management 105 was not queried for a digital signature when building the logged API communication. Thus detection system 109 can determine that the API communication was not subject to the signing process controlled by privilege management 105. Similarly, when any logged additional information identifying the API communication does not match additional information stored in secure storage 107, then the API communication was not subject to the signing process controlled by privilege manager 105.

After step 405, method 400 can proceed to step 407. In step 407, detection system 109 can determine that the access token is potentially compromised. As previously discussed, the absence of a digital signature (or a matching digital signature) or the absence of additional identifying information (or matching additional identifying information) can indicate that privilege management 105 was not involved in the building of the API communication. Thus the absence of a digital signature (or a matching digital signature) or the absence of additional identifying information (or matching additional identifying information) can indicate that the access token has been stolen or is otherwise unmanaged by system 100. In some embodiments, detection system 109 can determine whether data included in the intercepted second API communication is valid. For example, when the digital signature is calculated over one or more components of the API communication during construction of the API communication, validating the digital signature can comprise repeating the calculation using the logged components of the API communication. As would be appreciated by one of skill in the art, the digital signature can be computed using a key stored in privilege management 105 or secure storage 107. Thus detection system 109 can request secure storage 107 (or privilege management 105) compute a digital signature over the logged components of the API communication. Detection system 109 can compare the resulting signature to the digital signature inserted in the API communication to determine whether the API call was made outside the control of system 100. If so, then the access token may be compromised.

After step 407, method 400 can proceed to step 409. In step 409, system 100, or a component of system 100 (e.g., detection system 109) can determine information indicative of potentially malicious use of the access token. This determination can be based on an analysis of activity associated with the access token. Such an analysis can identify one or more attempted uses of the access token. These attempted uses may be by an unauthorized identity. Such an analysis can also identify an attempted use of the access token in an unauthorized operation. This analysis can be based on logged information, and/or information from a secure credential vault. This logged information (or information from the secure credential vault) can be associated with the access token. For example, the logged information can include records of API communications using the potentially compromised access token. As an additional example, the information can include an access key ID, a name of the API, a request time, a MAC address associated with the service, an IP address associated with the service, a name of the service, a name of a computing device associated with the service (e.g., a name of a computing device hosting the service), or similar identifiers.

In some embodiments, method 400 can further include an additional step of rejecting an API communication that uses a potentially compromised access token. In some aspects, detection system 109 can directly or indirectly instruct cloud environment 103 to reject API communications using a potentially compromised access token. For example, detection system 109 can indirectly instruct cloud environment 103 by instructing network resources 101 or network monitor 111 to instruct cloud environment 103 to reject API communications using a potentially compromised access token. Detection system 109 can issue such instructions when it is determined that the access token is potentially compromised.

In various aspects, method 400 can further include generating an alert of potentially malicious activity associated with the access token. This alert can include a GUI prompt, email, SMS message, automated phone call, or other notification. The alert can be provided to one or more administrators or users of system 100. This alert can indicate at least one of the identity, the access key, the API, and the service implicated in the improper API communication. This alert can also indicate forensics information, as described above. Detection system 109 can issue such an alert when it is determined that the access token is potentially compromised.

In accordance with the above disclosure, in an exemplary implementation, a proactive threat system (e.g. comprising one or more of privilege management 105, secure storage 107, detection system 109, and network monitor 111) can receive API communications from network resources 101, insert an encrypted digital signature into the API communications, and send them to cloud environment 103. In such an implementation, the inserted encrypted signature could be used to detect whether the access token used by the API communication was compromised, or whether the API communication was not managed by the proactive threat system (and therefore does not have the unique added user agent field signature).

Additionally, other network resources can be registered to the proactive threat system. These registered network resources can be provided with digital signatures. These network resources can be configured to embed the digital signatures into API communications issued to cloud environment 103. Either by reviewing logs associated with cloud environment 103, or by intercepting API communications from network resources, the proactive threat system can identify API communications made by unregistered network resources. For example, the proactive threat system can analyze logs of AMAZON WEB SERVICES API communications generated by the AWS CLOUDTRAIL service. From these logs, the proactive threat system can analyze the "User Agent" field of the AMAZON WEB SERVICES API communications, which can incorporate a digital signature for the source application of those API communications. In some embodiments, the proactive threat system can be configured to modify the user agent field with this digital signature (which may be encrypted). Then when the proactive threat system identifies in the AWS CLOUDTRAIL logs a record of an API call using a registered access key without a corresponding digital signature it can be configured to automatically alert a user or administrator, disable the access key, or rotate the access key, etc. In this manner it can prevent the use of access keys outside the proactive threat system or by applications not registered by the proactive threat system (and thus potentially stolen or used through non-legitimate procedures).

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed:

1. A non-transitory computer readable medium including instructions that, when executed by at least one processor, cause the at least one processor to perform operations for identifying potentially compromised cloud-based access information, the operations comprising:
    providing a unique signature for insertion into application programming interface (API) communications to be sent from a network resource to a cloud application executable in a cloud environment, wherein
        the unique signature is inserted into a respective API communication by modifying the respective API communication so that a field of a header of the respective API communication defined for holding other than a digital signature is modified to hold the unique signature,
        the unique signature is associated with an access token that a particular identity can use to request access to the cloud application,
        the unique signature is inserted during execution of the cloud application, and
        the unique signature is not a pre-defined portion of the API communications;
    accessing a log associated with the cloud environment, the log identifying a first API communication sent to the cloud environment from the network resource; and
    determining whether data extracted from a non-pre-defined portion of an API request indicates a compromised API communication made by an unregistered network resource, comprising:
        identifying, from within the first API communication, the unique signature and the access token;
        accessing a trusted validation resource storing signature information associated with the access token;
        determining, based on the trusted validation resource, whether the unique signature is valid; and
        determining, based on whether the unique signature is valid, whether the access token is potentially compromised.

2. The non-transitory computer readable medium of claim 1, wherein the unique signature is provided to the network resource as part of a process that generated the access token.

3. The non-transitory computer readable medium of claim 1, wherein the unique signature is provided to the network resource after the identity has been authenticated to the cloud environment and after the access token has been generated.

4. The non-transitory computer readable medium of claim 1, wherein the operations further comprise:
    accessing the log associated with the cloud environment, the log identifying a second API communication sent to the cloud environment from the network resource;
    determining that the second API communication includes the access token but does not include the unique signature; and
    determining, based on the second API communication not including the unique signature, that the access token is potentially compromised.

5. The non-transitory computer readable medium of claim 4, wherein the operations further comprise determining, based on an analysis of activity associated with the access token, information indicative of potentially malicious use of the access token.

6. The non-transitory computer readable medium of claim 5, wherein the analysis identifies an attempted use of the access token by an unauthorized identity.

7. The non-transitory computer readable medium of claim 5, wherein the analysis identifies an attempted use of the access token in an unauthorized operation.

8. The non-transitory computer readable medium of claim 5, wherein the analysis is based on information from a secure credential vault associated with the access token.

9. The non-transitory computer readable medium of claim 1, wherein the operations further comprise:
   intercepting, without reference to the log, a second API communication sent from the network resource and directed to the cloud environment; and
   determining, based on whether data included in the intercepted second API communication is valid, whether the access token is potentially compromised.

10. The non-transitory computer readable medium of claim 1, wherein the operations further comprise rejecting the first API communication when the access token is potentially compromised.

11. The non-transitory computer readable medium of claim 1, wherein the operations further comprise generating an alert of potentially malicious activity associated with the access token when the access token is potentially compromised.

12. The non-transitory computer readable medium of claim 1, wherein the trusted validation resource is a secure network vault.

13. The non-transitory computer readable medium of claim 1, wherein the unique signature is included in a field of the API request from the network resource to the cloud environment.

14. The non-transitory computer readable medium of claim 1, wherein the unique signature is encrypted using a private key before the unique signature is provided to the network resource.

15. The non-transitory computer readable medium of claim 1, wherein the unique signature is provided to an agent running on the network resource, the agent being configured to insert the unique signature into the first API communication.

16. The non-transitory computer readable medium of claim 1, wherein the identity is a user account on the network resource.

17. A computer-implemented method for identifying potentially compromised cloud-based access information, the method comprising:
   providing a unique signature for insertion into application programming interface (API) communications to be sent from a network resource to a cloud application executable in a cloud environment, wherein
      the unique signature is inserted into a respective API communication by modifying the respective API communication so that a field of a header of the respective API communication defined for holding other than a digital signature is modified to hold the unique signature,
      the unique signature is associated with an access token that a particular identity can use to request access to the cloud application,
      the unique signature is inserted during execution of the cloud application, and
      the unique signature is not a pre-defined portion of the API communications;
   accessing a log associated with the cloud environment, the log identifying a first API communication sent to the cloud environment from the network resource; and
   determining whether data extracted from a non-pre-defined portion of an API request indicates a compromised API communication made by an unregistered network resource, comprising:
      identifying, from within the first API communication, the unique signature and the access token;
      accessing a trusted validation resource storing signature information associated with the access token;
      determining, based on the trusted validation resource, whether the unique signature is valid; and
      determining, based on whether the unique signature is valid, whether the access token is potentially compromised.

18. The computer-implemented method of claim 17, further comprising:
   accessing the log associated with the cloud environment, the log identifying a second API communication sent to the cloud environment from the network resource;
   determining that the second API communication includes the access token but does not include the unique signature; and
   determining, based on the second API communication not including the unique signature, that the access token is potentially compromised.

19. The computer-implemented method of claim 17, further comprising:
   intercepting, without reference to the log, a second API communication sent from the network resource and directed to the cloud environment; and
   determining, based on whether data included in the intercepted second API communication is valid, whether the access token is potentially compromised.

20. The computer-implemented method of claim 17, further comprising nullifying the access token when the access token is potentially compromised.

21. The computer-implemented method of claim 17, further comprising rotating the access token when the access token is potentially compromised.

22. The computer-implemented method of claim 17, further comprising automatically generating a forensics report regarding activity associated with the access token when the access token is potentially compromised.

23. The computer-implemented method of claim 22, wherein the forensics report is based on data from the log.

24. The computer-implemented method of claim 22, wherein the forensics report is based on data from a secure credential vault.

* * * * *